(12) United States Patent
Jiroku (10) Patent No.: US 8,848,143 B2
(45) Date of Patent: Sep. 30, 2014

(54) ELECTRO-OPTICAL DEVICE, METHOD OF MANUFACTURING ELECTRO-OPTICAL DEVICE, AND ELECTRONIC APPARATUS

(75) Inventor: Hiroaki Jiroku, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 286 days.

(21) Appl. No.: 12/974,493

(22) Filed: Dec. 21, 2010

(65) Prior Publication Data

US 2011/0157530 A1 Jun. 30, 2011

(30) Foreign Application Priority Data

Dec. 24, 2009 (JP) ................................. 2009-291946

(51) Int. Cl.
*G02F 1/1333* (2006.01)
*G02F 1/1335* (2006.01)
*G02F 1/1362* (2006.01)

(52) U.S. Cl.
CPC .... *G02F 1/133553* (2013.01); *G02F 1/136227* (2013.01); *G02F 2001/133357* (2013.01)
USPC .......................................... 349/113; 349/138

(58) Field of Classification Search
USPC .......................................... 349/113, 114, 138
See application file for complete search history.

(56) References Cited

U.S. PATENT DOCUMENTS

| | | | |
|---|---|---|---|
| 6,037,197 A * | 3/2000 | Yamazaki et al. | 438/151 |
| 6,163,055 A | 12/2000 | Hirakata et al. | |
| 6,493,052 B1 * | 12/2002 | Satake et al. | 349/114 |
| 6,617,645 B2 | 9/2003 | Hirakata et al. | |
| 6,812,082 B2 | 11/2004 | Hirakata et al. | |
| 2004/0135937 A1 * | 7/2004 | Lee et al. | 349/106 |
| 2007/0046880 A1 | 3/2007 | Shigeta et al. | |
| 2007/0273800 A1 * | 11/2007 | Nomura et al. | 349/38 |
| 2009/0040447 A1 | 2/2009 | Nakagawa | |
| 2010/0079686 A1 | 4/2010 | Kawakami | |

FOREIGN PATENT DOCUMENTS

| | | |
|---|---|---|
| JP | 07-301824 A | 11/1995 |
| JP | 10-270708 A | 10/1998 |
| JP | 2002-532768 A | 10/2002 |
| JP | 2002-365663 A | 12/2002 |
| JP | 2007-293243 A | 11/2007 |
| JP | 2008-292537 A | 12/2008 |
| JP | 2009-063994 A | 3/2009 |
| WO | WO-0037248 A | 6/2000 |

* cited by examiner

*Primary Examiner* — Jessica M Merlin (74) *Attorney, Agent, or Firm* — ALG Intellectual Property, LLC (57) ABSTRACT

An electro-optical device including: a reflection film which is formed at each of a plurality of pixels; a dielectric multi-layer film which is formed over the reflection film; a planarizing isolation film over the dielectric multi-layer film burying a step formed by a reflection film; and a first alignment film which is formed over the planarizing isolation film. The reflection film, the dielectric multi-layer film, the planarizing isolation film, and the first alignment film are formed on the surface facing the second substrate in the first substrate.

14 Claims, 7 Drawing Sheets

ELECTRO-OPTICAL DEVICE, METHOD OF MANUFACTURING ELECTRO-OPTICAL DEVICE, AND ELECTRONIC APPARATUS

Japanese Patent Application No. 2009-291946, filed Dec. 24, 2009 is incorporated by reference in its entirety herein.

BACKGROUND

1. Technical Field

The present invention relates to a reflection type electro-optical device, a method of manufacturing the electro-optical device, and an electronic apparatus having the electro-optical device.

2. Related Art

Among various electro-optical devices, a reflection type liquid crystal device holds a liquid crystal layer between a first substrate and a second substrate, and a reflection film is formed on a surface facing the second substrate in the first substrate. For this reason, light incident from the second substrate is reflected by a reflection electrode on the side of the first substrate, and is emitted from the second substrate. When a light modulation is performed by the liquid crystal for this period of time, an image can be displayed thereon.

Here, when the reflection film is formed as a pixel electrode or the like, the reflection layer is independently formed at each of plural pixels. For this reason, a step is formed between a reflection film formation area having the reflection film and a boundary area interposed between the adjacent reflection films. When such a step is formed, a step is also formed on an alignment film, which causes alignment errors in the liquid crystal.

For this reason, there is proposed a configuration in which the step is buried by an isolation film (a dielectric layer) forming the lowermost layer of the dielectric multi-layer film or an isolation film on the lower layer side of the dielectric multi-layer film when a reflection increasing film formed as a dielectric multi-layer film is formed on the upper layer of the reflection film. More specifically, there is proposed a configuration in which an isolation film is formed to be thick when forming the dielectric multi-layer film or before forming the dielectric multi-layer film and the surface is planarized to bury the step (refer to JP-A-2007-293243).

However, when the configuration disclosed in JP-A-2007-293243 is adopted, the following problem arises. That is, there is a problem that it is difficult to simultaneously solve the step caused by the reflection layer and form the reflection increasing film.

First, when the step is buried by the isolation film on the lower layer side of the dielectric multi-layer film, the isolation film is thinned by a polishing treatment, and the surface of the reflection layer is exposed by an etchback treatment. However, a problem arises in that a step is formed between the isolation film and the reflection layer due to a difference in the etching rate between the isolation film and the reflection layer.

Further, when the step is buried by the isolation film (dielectric layer) forming the lowermost layer of the dielectric multi-layer film, the isolation film is thinned by a polishing treatment and an etchback treatment, and the isolation film is left on the reflection layer so as to have a predetermined thickness. However, when such a configuration is adopted, a difference in the thickness of the isolation film left on the reflection layer occurs due to a difference in the polishing amount or etchback amount. For this reason, it is difficult to form the dielectric film forming the reflection increasing film to have an optimal film thickness.

SUMMARY

An advantage of some aspects of the invention is that it provides a reflection type electro-optical device capable of simultaneously removing a step caused by a reflection layer and forming a dielectric multi-layer film having an appropriate film configuration and serving as a reflection increasing film, a method of manufacturing the electro-optical device, and an electronic apparatus having the electro-optical device.

In order to solve the above-described problems, according to an aspect of the invention, there is provided an electro-optical device that holds a liquid crystal layer between a first substrate and a second substrate, the electro-optical device including: a reflection film which is formed at each of a plurality of pixels; a dielectric multi-layer film which is formed on the upper layer side of the reflection film throughout the plurality of pixels; a planarizing isolation film which is formed on the upper layer side of the dielectric multi-layer film and buries a step formed by a reflection film formation area having the reflection film and a boundary area interposed between the adjacent reflection films; and a first substrate side alignment film which is formed on the upper layer side of the planarizing isolation film, wherein the reflection film, the dielectric multi-layer film, the planarizing isolation film, and the first substrate side alignment film are formed on the surface facing the second substrate in the first substrate.

According to another aspect of the invention, there is provided a method of manufacturing an electro-optical device that holds a liquid crystal layer between a first substrate and a second substrate, the method including: forming a reflection film at each of a plurality of pixels on a surface facing the second substrate in the first substrate; forming a dielectric multi-layer film on the upper layer side of the reflection film throughout the plurality of pixels; forming a planarizing isolation film on the upper layer side of the dielectric multi-layer film; and planarizing the planarizing isolation film by thinning the planarizing isolation film from the surface side thereof.

According to the aspect, the reflection film is formed at each of the plurality of pixels on the surface facing the second substrate in the first substrate, and the dielectric multi-layer film is formed on the upper layer side of the reflection film throughout the plurality of pixels. Subsequently, the planarizing isolation film is formed on the upper layer side of the dielectric multi-layer film, and then the planarizing isolation film is thinned from the surface side thereof. That is, the dielectric multi-layer film is formed while the planarizing isolation film or the like is not present on the upper layer side of the reflection film, and then the step is buried by the planarizing isolation film. For this reason, even when a configuration is adopted in which the first substrate side alignment film is formed on the flat surface formed by burying the step using the planarizing isolation film, it is possible to form the dielectric multi-layer film having an appropriate film configuration and serving as a reflection increasing film.

According to the aspect, the reflection film is, for example, a pixel electrode. With such a configuration, it is possible to simultaneously form the reflection film and the pixel electrode by using a common reflective conduction film.

According to the aspect, the film thickness of the planarizing isolation film at the boundary area may be thicker than that at the reflection film formation area, and the planarizing isolation film may be formed at both the boundary area and the reflection film formation area. The surface of the planarizing isolation film may be formed as a continuous flat surface.

In this case, the refractive index of the planarizing isolation film may be lower than that of a dielectric layer forming the uppermost layer in the dielectric multi-layer film. With such a configuration, even when the planarizing isolation film is laminated on the upper layer of the dielectric multi-layer film, it is possible to prevent the characteristic of the reflection increasing film of the dielectric multi-layer film from being greatly degraded by a difference in the film thickness of the planarizing isolation film.

In addition, the electro-optical device may further include: a second substrate side underlying film which is formed on the surface facing the first substrate in the second substrate; and a second substrate side alignment film which is formed on the surface of the second substrate side underlying film, wherein the second substrate side underlying film and the planarizing isolation film are formed as the same isolation film. With such a configuration, since the first substrate side alignment film and the second substrate side alignment film can be formed on the underlying film formed as the same isolation film, it is possible to form the first substrate side alignment film and the second substrate side alignment film to have the same characteristic. Therefore, even when the liquid crystal layer is driven by a driving signal for which the polarity is reversed, it is possible to display an image with high quality.

According to the aspect, the planarizing isolation film may be formed only at the boundary area among the boundary area and the reflection film formation area, and the surface of the planarizing isolation film and the surface of the dielectric multi-layer film located on the reflection film are formed as a continuous flat surface.

In this case, a first substrate side underlying film may be formed on the flat surface and have a refractive index lower than that of the dielectric layer forming the uppermost layer of the dielectric multi-layer film, and the first substrate side alignment film may be formed on the upper layer of the first substrate side underlying film. With such a configuration, even when the first substrate side underlying film is laminated on the upper layer of the dielectric multi-layer film, it is possible to prevent the characteristic as the reflection increasing film of the dielectric multi-layer film from being greatly degraded by a difference in the film thickness of the first substrate side underlying film.

Further, according to the aspect, the electro-optical device may further include: a second substrate side underlying film which is formed on the surface facing the first substrate in the second substrate; and a second substrate side alignment film which is formed on the surface of the second substrate side underlying film, wherein the second substrate side underlying film and the first substrate side underlying film are formed as the same isolation film. With such a configuration, since the first substrate side alignment film and the second substrate side alignment film can be formed on the underlying film formed as the same isolation film, it is possible to form the first substrate side alignment film and the second substrate side alignment film to have the same characteristic. Therefore, even when the liquid crystal layer is driven by an AC (alternating-current) signal of which the polarity changes, it is possible to display an image with high quality.

The electro-optical device of the aspect may be used in an electronic apparatus such as a cellular phone or a mobile computer. Further, the electro-optical device of the aspect may be also used in a projection type display device as an electronic apparatus, where the projection type display device includes a light source unit which supplies light to the electro-optical device and a projection optical system which projects light optically modulated by the electro-optical device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Exemplary embodiments of the invention will be described with reference to the accompanying drawings. Further, in the respective drawings to be used for reference in the description below, the scales of respective layers or members are set to be different from the real scales so as to be recognized in the drawings. Furthermore, although the source and the drain of the transistor are switched when the direction of current flowing to a pixel transistor is reversed, for convenience in the following description, the side connected to the pixel electrode is set to the drain, and the side connected to the data line is set to the source.

First Embodiment

Overall Configuration

Figure 1:
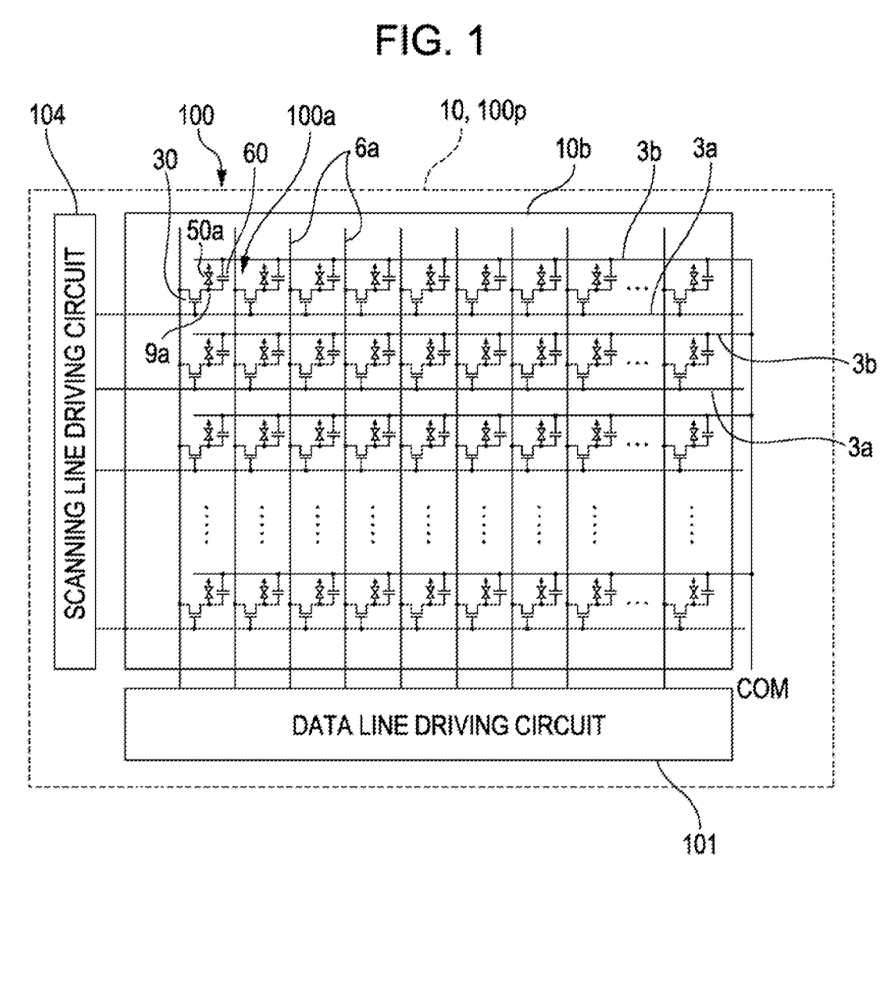
FIG. 1 is a block diagram illustrating an electrical configuration of an electro-optical device according to a first embodiment of the invention.
Figure 2A:
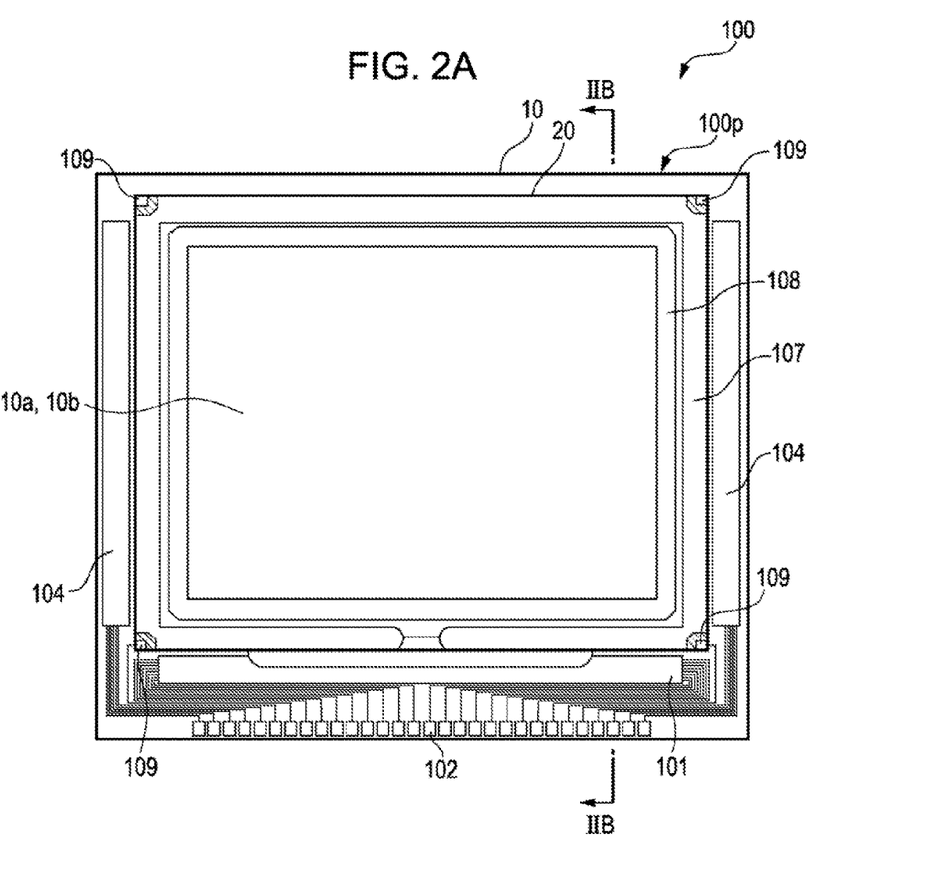
FIGS. 2A and 2B are diagrams illustrating a specific configuration of the electro-optical device according to the first embodiment of the invention.
Figure 2B:
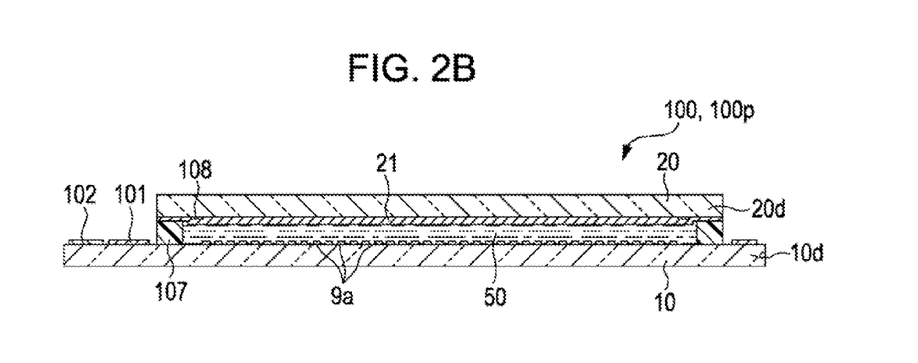

FIG. 1 is a block diagram illustrating an electrical configuration of an electro-optical device according to a first embodiment of the invention. FIGS. 2A and 2B are diagrams illustrating a specific configuration of the electro-optical device according to the first embodiment of the invention, where FIG. 2A is a plan view when a liquid crystal panel of the electro-optical device and its constituents are seen from the side of the counter substrate, and FIG. 2B is a cross-sectional view taken along the line IIB-IIB.

As shown in FIG. 1, an electro-optical device 100 is a liquid crystal device, and includes a liquid crystal panel 100p. The liquid crystal panel 100p includes a pixel area 10b formed at the center area thereof so as to arrange a plurality of pixels 100a in a matrix shape. In the liquid crystal panel 100p, a first substrate 10 to be described later has a configuration in which a plurality of data lines 6a and scanning lines 3a is arranged vertically and horizontally within the pixel area 10b, and a pixel 100a is disposed at a position corresponding to the intersection point thereof. Each of the plurality of pixels 100a includes a pixel transistor 30 formed as a field effect transistor and a pixel electrode 9a to be described later. The data line 6a is electrically connected to the source of the pixel transistor 30, the scanning line 3a is electrically connected to the gate of the pixel transistor 30, and the pixel electrode 9a is electrically connected to the drain of the pixel transistor 30.

In the first substrate 10, a scanning line driving circuit 104 and a data line driving circuit 101 are formed on the outside area of the pixel area 10b. The data line driving circuit 101 is electrically connected to one end of each of the data lines 6a, and image signals supplied from an image processing circuit are sequentially supplied to the data lines 6a. The scanning line driving circuit 104 is electrically connected to each of the scanning lines 3a, and scanning signals are sequentially supplied to the scanning lines 3a.

In each of the pixels 100a, the pixel electrode 9a forms a liquid crystal capacitance 50a while facing a common electrode formed on a counter substrate to be described later with a liquid crystal interposed therebetween. Further, a storage capacitance 60 is attached to each of the pixels 100a in parallel to the liquid crystal capacitance 50a so as to prevent a variation in the image signal stored in the liquid crystal capacitance 50a. In the embodiment, capacitance lines 3b are formed in parallel to the scanning lines 3a throughout the plurality of pixels 100a in order to form the storage capacitance 60.

As shown in FIGS. 2A and 2B, in the liquid crystal panel 100p of the electro-optical device 100, a first substrate 10 (an element substrate) and a second substrate 20 (a counter substrate) are bonded to each other with a predetermined gap therebetween using a sealing material 107, and the sealing material 107 is disposed along the edge of the second substrate 20. The sealing material 107 is an adhesive that is formed of a light curing resin, a thermosetting resin, or the like, and a gap material such as a glass fiber or a glass bead is mixed with the sealing material so as to ensure a predetermined distance between both substrates. In the embodiment, a substrate body 10d of the first substrate 10 is a transmissive substrate, and a substrate body 20d of the second substrate 20 is also a transmissive substrate. Further, as the substrate body 10d of the first substrate 10, an opaque substrate such as a single crystal silicon substrate may be used.

In the first substrate 10, a data line driving circuit 101 and a plurality of terminals 102 are formed along one edge of the first substrate 10 on the outside area of the sealing material 107, and the scanning line driving circuits 104 are formed along other edges adjacent to the one edge. Further, a vertical conduction material 109 is formed at least one corner position of the second substrate 20 so as to electrically connect the first substrate 10 and the second substrate 20 to each other.

Although it will be described later in detail, the reflective pixel electrodes 9a (reflection layer) formed of an aluminum-based material such as aluminum or aluminum alloy or a silver-based material such as silver and silver alloy are formed in a matrix shape on the first substrate 10. In the embodiment, the pixel electrode 9a is formed by using an aluminum-based material such as aluminum or aluminum alloy among the above-described metal materials.

On the other hand, a frame 108 formed of a light shielding material is formed on the inside area of the sealing material 107 in the second substrate 20, and the inside area of the frame 108 is formed as an image display area 10a. The second substrate 20 is provided with a common electrode 21 (a transmissive electrode) that is formed as ITO (Indium Tin Oxide). Further, a light shielding film (not shown) called a black matrix or a black stripe may be formed at a position facing the pixel electrode 9a in the second substrate 20.

Further, a dummy pixel may be formed in an area overlapping with the frame 108 or the like in the pixel area 10b. In this case, the area of the pixel area 10b excluding the dummy pixel is used as the image display area 10a.

In the reflection type electro-optical device 100, light incident from the side of the second substrate 20 is reflected by the pixel electrode 9a, and is again emitted from the side of the second substrate 20. For this period of time, a light modulation is performed for each pixel by a liquid crystal layer 50, thereby displaying an image. A polarizing film, a retardation film, a polarizing plate, and the like are arranged in a predetermined direction on the surface of the light incident side of the second substrate 20 in accordance with the type of the liquid crystal layer 50 to be used, that is, an operation mode such as a TN (Twisted Nematic) mode and a STN (Super TN) mode or a normally white mode/a normally black mode. Here, when the electro-optical device 100 is used as a light bulb of a projection type display device (a liquid crystal projector) to be described later with reference to FIGS. 8A to 8C, since the light of each color is incident, a color filter is not formed thereon. On the contrary, when the electro-optical device 100 is used as a direct view type color display device of an electronic apparatus such as a mobile computer or a cellular phone to be described later with reference to FIGS. 8A to 8C, a color filter (not shown) or a protective film is formed on the second substrate 20.

Configuration of Each Pixel

Figure 3A:
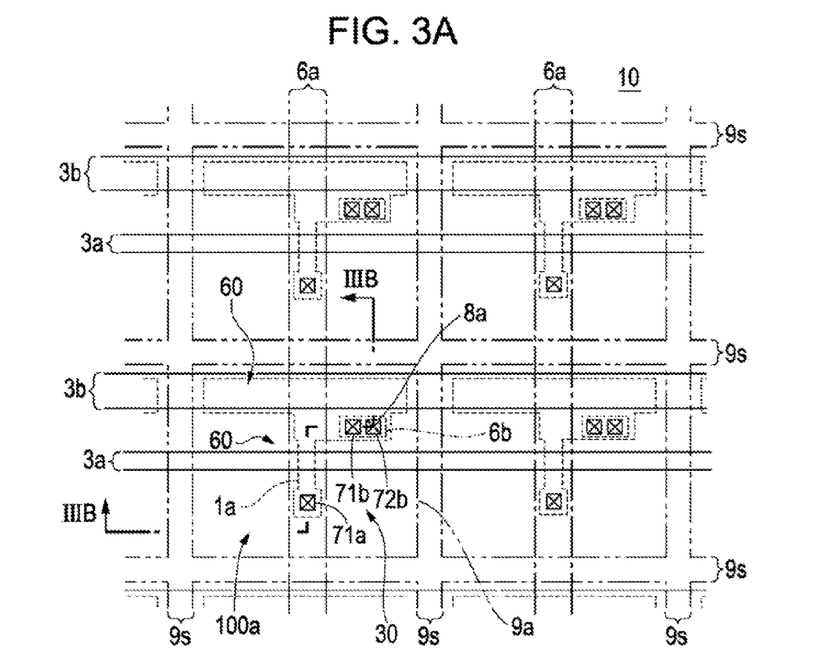
FIGS. 3A and 3B are diagrams illustrating a configuration of a pixel of the reflection type electro-optical device according to the first embodiment of the invention.
Figure 3B:
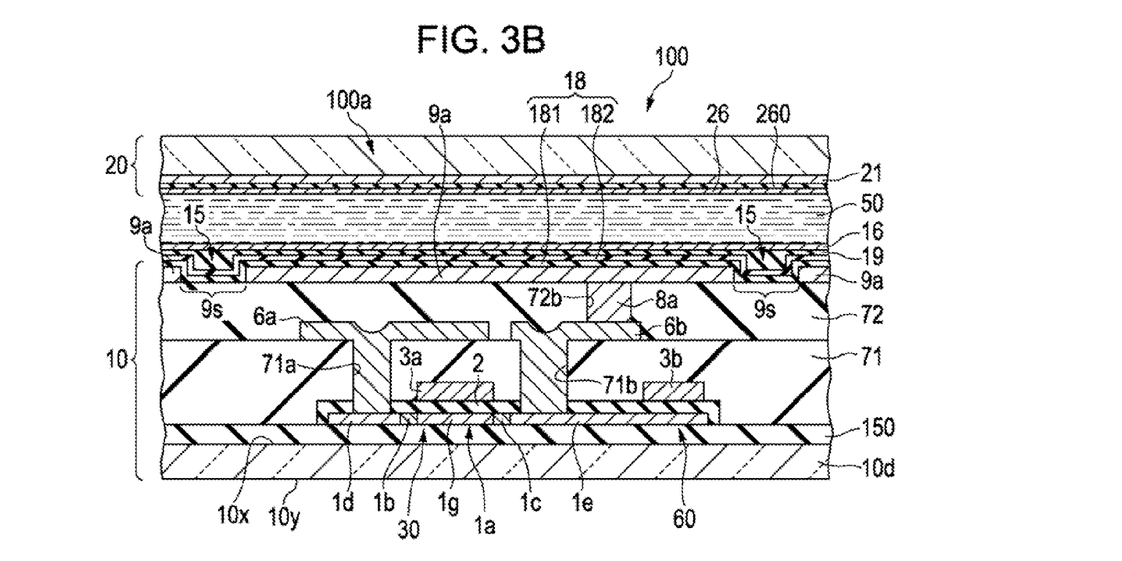

FIGS. 3A and 3B are diagrams illustrating the configuration of the pixel of the reflection type electro-optical device 100 according to the first embodiment of the invention, where FIG. 3A is a plan view illustrating the pixels adjacent to each other in the first substrate 10 using the reflection type electro-optical device 100, and FIG. 3B is a cross-sectional view when the electro-optical device 100 is cut at the position corresponding to the line IIIB-IIIB. Further, in FIG. 3A, the data line 6a is depicted by the one-dotted chain line, the scanning line 3a and the capacitance line 3b are depicted by the solid line, the semiconductor layer 1a is depicted by the thin dotted line, and the pixel electrode 9a is depicted by the two-dotted chain line.

As shown in FIGS. 3A and 3B, the first substrate 10 has a configuration in which a transmissive underlying isolation layer 150 formed as a silicon dioxide film is formed on the first surface 10x facing the second substrate 20 among the first surface 10x and the second surface 10y of the substrate body 10d formed as a quartz substrate or a glass substrate, and the N-channel type pixel transistor 30 is formed at the position overlapping with the pixel electrode 9a on the upper layer side thereof. The pixel transistor 30 has an LDD structure in which a channel area 1g, a low-concentration source area 1b, a high-concentration source area 1d, a low-concentration drain area 1c, and a high-concentration drain area 1e are formed on the semiconductor layer 1a formed as an island-shaped poly-silicon film or an island-shaped single crystal semiconductor layer. A gate isolation layer 2 formed as a silicon dioxide film or a silicon nitride film is formed on the surface side of the semiconductor layer 1a, and a gate electrode (scanning line 3a) formed as a metallic film or a doped silicon film is formed on the surface of the gate isolation layer 2. Further, in a portion extending from the high-concentration drain area 1e in the semiconductor layer 1a, the capacitance line 3b faces the portion with the gate isolation layer 2 interposed therebetween, and the storage capacitance 60 is formed thereon.

In the embodiment, the pixel transistor 30 has an LDD (Lightly Doped Drain) structure, but may adopt a structure in which the high-concentration source area and the high-concentration drain area are formed on the scanning line 3a in a self-aligned manner. Further, in the embodiment, the gate isolation layer 2 is formed as a silicon dioxide film formed by thermal oxidation, but may be formed by using a silicon dioxide film or a silicon nitride film formed by a CVD method or the like. Furthermore, the gate isolation layer 2 may be formed as multiple layers of a silicon dioxide film formed by thermal oxidation and a silicon dioxide film or a silicon nitride film formed by a CVD method or the like.

Interlayer isolation films 71 and 72 formed as a transmissive isolation film such as a silicon dioxide film or a silicon nitride film are formed on the upper layer side of the pixel transistor 30. The data line 6a and the drain electrode 6b formed as a metallic film or a doped silicon film are formed on the surface of the interlayer isolation film 71, the data line 6a is electrically connected to the high-concentration source area 1d via a contact hole 71a formed in the interlayer isolation film 71, and the drain electrode 6b is electrically connected to the high-concentration drain area 1e via a contact hole 71b formed in the interlayer isolation film 71. The reflective pixel electrode 9a (reflection layer) is formed as an island shape at each of the plurality of pixels 100a on the surface of the interlayer isolation film 72, and the pixel electrode 9a is electrically connected to the drain electrode 6b via a contact hole 72b formed in the interlayer isolation film 72. For such an electrical connection, in the embodiment, the inside of the contact hole 72b is buried by a conduction film called a plug 8a, and the pixel electrode 9a is electrically connected to the drain electrode 6b via the plug 8a. The surfaces of the interlayer isolation film 72 and the plug 8a are formed as a continuous flat surface, and the pixel electrode 9a is formed on the flat surface.

A dielectric multi-layer film 18 to be described later, a planarizing isolation film 19, and a first substrate side alignment film 16 formed as an oblique deposition film such as a silicon oxide film are sequentially laminated on the surface side of the pixel electrode 9a.

The common electrode 21 is formed as an ITO film and is formed on the overall surface facing the first substrate 10 in the substrate body 20d of the second substrate 20 in a solid shape. A second substrate side underlying film 260 formed as a silicon dioxide film and a second substrate side alignment film 26 formed as an oblique deposition film are sequentially formed on the surface side of the common electrode 21.

In the first substrate 10 and the second substrate 20 having such a configuration, the pixel electrode 9a and the common electrode 21 are disposed to face each other, and the liquid crystal layer 50 as an electro-optical material is enclosed in a space surrounded by the sealing material 107 between the substrates. The liquid crystal layer 50 takes a predetermined alignment state by the first substrate side alignment film 16 and the second substrate side alignment film 26 respectively formed on the first substrate 10 and the second substrate 20 while an electric field is not applied from the pixel electrode 9a. The liquid crystal layer 50 is formed by mixing, for example, one or various types of nematic liquid crystals.

In the embodiment, in the second substrate 20, since the common electrode 21 is substantially formed on the overall surface of the second substrate 20, the surface of the common electrode 21 is formed as a flat surface. Accordingly, the surface of the second substrate side underlying film 260 is also formed as a flat surface. For this reason, it is possible to appropriately form the second substrate side alignment film 26 by oblique deposition.

On the contrary, in the first substrate 10, the pixel electrode 9a is formed as an independent island shape at each of the pixels 100a. For this reason, a step 15 corresponding to the thickness of the pixel electrode 9a is present between the formation area (reflection layer formation area) of the pixel electrode 9a and the boundary area 9s interposed between the adjacent pixel electrodes 9a. Therefore, in the embodiment, since the configuration described below is adopted, the step 15 formed between the formation area of the pixel electrode 9a and the boundary area 9s is removed, and the first substrate side alignment film 16 is formed on a flat surface by oblique deposition.

Planarized Structure of First Substrate 10

As shown in FIG. 3B, in the embodiment, the dielectric multi-layer film 18 is formed on the upper layer side of the pixel electrode 9a throughout the plurality of pixels 100a, and the planarizing isolation film 19 for burying the step 15 formed in the boundary area 9s and the formation area of the pixel electrode 9a is formed on the upper layer side of the dielectric multi-layer film 18.

More specifically, a first dielectric layer 181 forming the lower layer of the dielectric multi-layer film 18 is formed on the upper layer side of the pixel electrode 9a throughout the plurality of pixels 100a, and a second dielectric layer 182 forming the upper layer of the dielectric multi-layer film 18 is formed throughout the plurality of pixels 100a on the upper layer side of the first dielectric layer 181. The first dielectric layer 181 is a silicon dioxide film ($SiO_2$/refractive index=1.46) having a thickness of 60 to 80 nm, and the second dielectric layer 182 is a silicon nitride film ($Si_3N_4$/refractive index=2.05) having a thickness of 50 to 70 nm, where the refractive index of the second dielectric layer 182 (the silicon nitride film) is larger than that of the first dielectric layer 181 (the silicon dioxide film). In addition, the optical film thickness nd (n=refractive index, d=film thickness) of each of the first dielectric layer 181 and the second dielectric layer 182 is set to ¼ times of the wavelength $\lambda_0$ set in design. Accordingly, the dielectric multi-layer film 18 functions as a reflection increasing film that increases the refractive index of the surface of the pixel electrode 9a.

The dielectric multi-layer film 18 is substantially formed to have the same film thickness in both the boundary area 9s and the formation area of the pixel electrode 9a. For this reason, the step 15 corresponding to the thickness of the pixel electrode 9a is formed on the surface of the dielectric multi-layer film 18 due to the boundary area 9s and the formation area of the pixel electrode 9a.

Here, the planarizing isolation film 19 formed as a silicon dioxide film is formed on the upper layer of the dielectric multi-layer film 18, and the step 15 formed on the surface of the dielectric multi-layer film 18 is removed by the planarizing isolation film 19. More specifically, the planarizing isolation film 19 is formed on the upper layer of the dielectric multi-layer film 18, and the planarizing isolation film 19 is formed in both the boundary area 9s and the formation area of the pixel electrode 9a. However, the film thickness of the planarizing isolation film 19 formed in the boundary area 9s is thicker than that in the formation area of the pixel electrode 9a. Further, the film thickness of the planarizing isolation film 19 formed in the boundary area 9s is larger than that in the formation area of the pixel electrode 9a by a degree corresponding to the step 15 (a degree corresponding to the thickness of the pixel electrode 9a) formed on the surface of the dielectric multi-layer film 18. As described later with reference to FIGS. 4A to 5, the planarizing isolation film 19 having such a configuration is formed in such a manner that an isolation film is formed on both the boundary area 9s and the formation area of the pixel electrode 9a to have a film thickness equal to or more than that of the step 15, and the surface thereof is thinned by polishing or the like. For this reason, the surface of the planarizing isolation film 19 is formed as a continuous flat surface. Accordingly, it is possible to appropriately form the first substrate side alignment film 16 by oblique deposition.

Further, in the second substrate 20, the second substrate side alignment film 26 is formed on the second substrate side underlying film 260 formed as a silicon dioxide film. In the first substrate 10, the first substrate side alignment film 16 is formed on the planarizing isolation film 19 formed as a silicon dioxide film. For this reason, the first substrate side alignment film 16 and the second substrate side alignment film 26 have the same characteristics. In addition, although the work functions of the pixel electrode 9a and the common electrode 21 are different from each other, the planarizing isolation film 19 formed as a silicon dioxide film is interposed between the pixel electrode 9a and the first substrate side alignment film 16, and the second substrate side underlying film 260 formed as a silicon dioxide film is interposed between the common electrode 21 and the second substrate side alignment film 26. Therefore, even when the liquid crystal layer 50 is driven by an AC signal, a symmetric electric field is applied to the liquid crystal layer 50. For this reason, even when the same pattern is displayed in the electro-optical device 100 for a long period of time, inconvenience such as image persistence does not occur.

Method of Manufacturing Electro-Optical Device 100

Figure 4A:
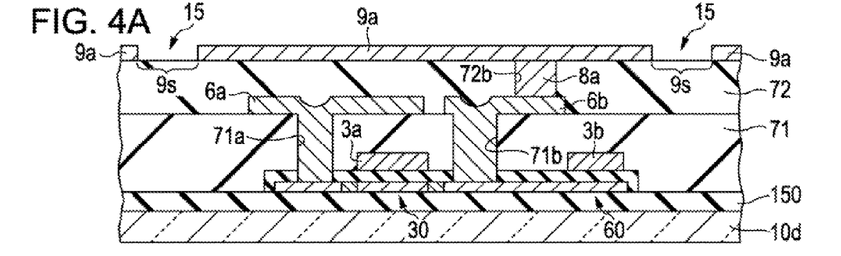
FIGS. 4A to 4D are cross-sectional views illustrating the steps until forming a planarizing isolation film after forming a pixel electrode (a reflection layer) in a method of manufacturing the electro-optical device according to the first embodiment of the invention.

Hereinafter, the configuration of the electro-optical device 100 will be described in detail while describing a method of manufacturing the electro-optical device 100 according to the invention with reference to FIGS. 4A to 5. FIGS. 4A to 4D are cross-sectional views illustrating the steps until forming the planarizing isolation film 19 after forming the pixel electrode 9a (the reflection layer) in the method of manufacturing the electro-optical device 100 according to the first embodiment of the invention. FIG. 5 is a cross-sectional view illustrating the step of thinning the planarizing isolation film 19 in the method of manufacturing the electro-optical device 100 according to the first embodiment of the invention.

First, as shown in FIG. 4A, the pixel electrode 9a formed as an aluminum-based material such as aluminum or aluminum alloy is formed as an island shape. In this state, the step 15 corresponding to the thickness of the pixel electrode 9a is formed between the formation area of the pixel electrode 9a and the boundary area 9s interposed between the adjacent pixel electrodes 9a.

Subsequently, the dielectric multi-layer film 18 is formed by the step of forming the dielectric multi-layer film shown in FIGS. 4B and 4C. More specifically, the first dielectric layer 181 formed as a silicon dioxide film having a thickness of 60 to 80 nm is formed by a method such as a CVD (Chemical Vapor Deposition) method or a PVD (Physical Vapor Deposition) method such as an ion plating method, a vacuum deposition method, and a sputter method so as to cover the surface of the pixel electrode 9a and the surface of the inter-layer isolation film 72 exposed from the boundary area 9s interposed between the adjacent pixel electrodes 9a. Subsequently, the second dielectric layer 182 formed as a silicon nitride film having a thickness of 50 to 70 nm is formed by a PVD method, a CVD method, or the like. As a result, the dielectric multi-layer film 18 including the first dielectric layer 181 and the second dielectric layer 182 is formed on the upper layer side of the pixel electrode 9a so as to have the constant thickness in both the pixel electrode 9a and the boundary area 9s. The step 15 corresponding to the thickness of the pixel electrode 9a is formed on the surface of the dielectric multi-layer film 18.

Subsequently, in the step of forming the planarizing isolation film shown in FIG. 4D, the planarizing isolation film 19 formed as a thick silicon dioxide film is formed on the upper layer side of the dielectric multi-layer film 18 by a PVD method or a CVD method. At this time point, the step 15 corresponding to the thickness of the pixel electrode 9a is formed on the surface of the planarizing isolation film 19.

Subsequently, in the step of planarizing the step shown in FIG. 5, the surface of the planarizing isolation film 19 is formed as a flat surface by thinning the planarizing isolation film 19. More specifically, the surface of the planarizing isolation film 19 is polished. At this time, the planarizing isolation film 19 is left in both the boundary area 9s and the formation area of the pixel electrode 9a. As a result, since the film thickness of the planarizing isolation film 19 in the boundary area 9s is thicker than that in the formation area of the pixel electrode 9a, the surface of the planarizing isolation film 19 is formed as a continuous flat surface. Such a polishing may be performed by using a chemical mechanical polishing. In the chemical mechanical polishing, a smooth polished surface can be rapidly obtained by the relative movement between the first substrate 10 and an abrasive and the effect of chemical components contained in a polishing solution. More specifically, in a polishing machine, the polishing is performed by relatively rotating a holder holding the first substrate 10 and a platen attached with an abrasive cloth (pad) formed of porous fluorine resin, foamed polyurethane, and a felt. At this time, for example, an abrasive containing water, an acrylic acid ester derivative as a dispersant, and cerium oxide particles having an average particle size of 0.01 to 20 μm is supplied between the abrasive cloth and the first substrate 10. Further, an etchback treatment may be simultaneously used in the planarizing step.

Subsequently, as shown in FIG. 3B, the first substrate side alignment film 16 is formed on the surface of the planarizing isolation film 19 by oblique deposition.

Main Effect of Embodiment

As described above, in the electro-optical device 100 of the embodiment, the pixel electrode 9a formed as a reflection film is formed at each of the plurality of pixels 100a of the first substrate 10, and the dielectric multi-layer film 18 is formed on the upper layer side of the pixel electrode 9a throughout the plurality of pixels 100a. Subsequently, the planarizing isolation film 19 is formed on the upper layer side of the dielectric multi-layer film 18, and then the planarizing isolation film 19 is thinned from the surface side thereof. That is, the dielectric multi-layer film 18 is formed while the planarizing isolation film 19 or the like is not present on the upper layer side of the pixel electrode 9a, and then the step is buried by the planarizing isolation film 19. For this reason, even when the step 15 is buried by the planarizing isolation film 19 to form a flat surface, the dielectric multi-layer film 18 is directly formed on the pixel electrode 9a, and the dielectric layer (the first dielectric layer 181 and the second dielectric layer 182) forming the dielectric multi-layer film 18 is not subjected to polishing or the like. Therefore, the film thickness of the dielectric layer (the first dielectric layer 181 and the second dielectric layer 182) forming the dielectric multi-layer film 18 is controlled with high precision in a film formation condition. Therefore, even when a configuration is adopted in which the step 15 is buried by the planarizing isolation film 19 and the first substrate side alignment film 16 is formed on the flat surface, it is possible to form the dielectric multi-layer film 18 having an appropriate film composition and serving as a reflection increasing film.

Further, in the formation area of the pixel electrode 9a, the planarizing isolation film 19 is left on the upper layer of the dielectric multi-layer film 18, but the planarizing isolation film 19 is a silicon dioxide film having a refractive index lower than that of the second dielectric layer 182 (a silicon nitride film) forming the uppermost layer in the dielectric multi-layer film 18. For this reason, even when the planarizing isolation film 19 is laminated on the upper layer of the dielectric multi-layer film 18 in the formation area of the pixel electrode 9a, a difference in the film thickness of the planarizing isolation film 19 does not greatly degrade the characteristic as the reflection increasing film of the dielectric multi-layer film 18.

Furthermore, the second substrate side underlying film 260 and the planarizing isolation film 19 are formed as the same isolation film (silicon dioxide film). For this reason, since the first substrate side alignment film 16 and the second substrate side alignment film 26 can be formed on the underlying film formed as the same isolation film, the first substrate side alignment film 16 and the second substrate side alignment film 26 can be formed to have the same characteristics. Therefore, even when the liquid crystal layer 50 is driven by an AC signal of which the polarity is reversed, display errors such as image persistence do not occur, thereby displaying an image with high quality.

Second Embodiment

Configuration of Electro-Optical Device 100

Figure 6:
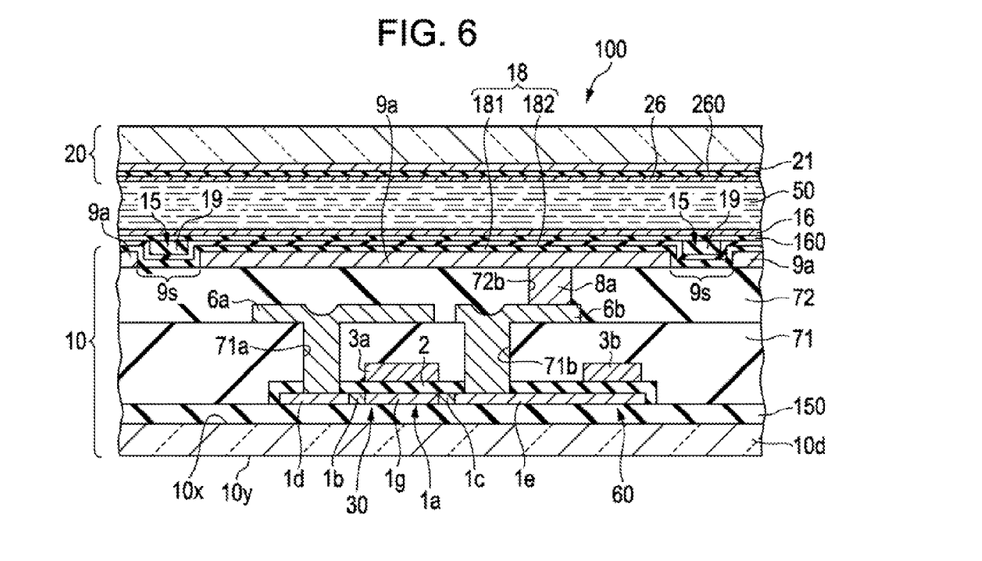
FIG. 6 is a diagram illustrating a cross-sectional configuration of an electro-optical device according to a second embodiment of the invention.

FIG. 6 is a diagram illustrating a cross-sectional configuration of the electro-optical device 100 according to a second embodiment of the invention. Further, since the basic configuration of the embodiment is equal to that of the first embodiment, the description of the same components will be omitted by giving the same reference numerals thereto.

As shown in FIG. 6, even in the electro-optical device 100 of the embodiment, the reflective pixel electrode 9a (reflection layer) is formed as an island shape at each of the plurality of pixels 100a on the surface of the interlayer isolation film 72 as in the first embodiment. The pixel electrode 9a is formed on the flat surface formed by the surface of the interlayer isolation film 72 and the surface of the plug 8a. The dielectric multi-layer film 18, the planarizing isolation film 19, and the first substrate side alignment film 16 formed as an oblique deposition film described in the first embodiment are sequentially laminated on the upper layer side of the pixel electrode 9a. The dielectric multi-layer film 18 includes the first dielectric layer 181 formed as a silicon dioxide film having a thickness of 60 to 80 nm and disposed on the lower layer side and the second dielectric layer 182 formed as a silicon nitride film having a thickness of 50 to 70 nm and disposed on the upper layer side, and functions as a reflection increasing film that increases a refractive index on the surface of the pixel electrode 9a.

In the embodiment, differently from the first embodiment, the first substrate side underlying film 160 formed as a silicon dioxide film is formed on the upper layer side of the planarizing isolation film 19, and the first substrate side alignment film 16 is formed on the upper layer of the first substrate side underlying film 160.

As in the first embodiment, the common electrode 21 is formed as an ITO film and is formed on the overall surface facing the first substrate 10 in the substrate body 20d of the second substrate 20 in a solid shape. A second substrate side underlying film 260 formed as a silicon dioxide film and a second substrate side alignment film 26 formed as an oblique deposition film are sequentially formed on the surface side of the common electrode 21. In the second substrate 20, since the common electrode 21 is substantially formed on the overall surface of the second substrate 20, the surface of the common electrode 21 is a flat surface. Accordingly, the surface of the second substrate side underlying film 260 is also a flat surface. Therefore, it is possible to appropriately form the second substrate side alignment film 26 by oblique deposition.

On the contrary, in the first substrate 10, the pixel electrode 9a is formed as an independent island shape at each of the pixels 100a. For this reason, a step 15 corresponding to the thickness of the pixel electrode 9a is present between the formation area (reflection layer formation area) of the pixel electrode 9a and the boundary area 9s interposed between the adjacent pixel electrodes 9a. Further, since the dielectric multi-layer film 18 is formed throughout the plurality of pixels 100a, the dielectric multi-layer film 18 is formed in both the boundary area 9s and the formation area of the pixel electrode 9a so as to have the same thickness. Therefore, the step 15 corresponding to the thickness of the pixel electrode 9a is formed on the surface of the dielectric multi-layer film 18 by the boundary area 9s and the formation area of the pixel electrode 9a.

Here, the planarizing isolation film 19 for burying the step 15 formed by the boundary area 9s and the formation area of the pixel electrode 9a is formed on the upper layer side of the dielectric multi-layer film 18. The planarizing isolation film 19 is formed only at the boundary area 9s among the boundary area 9s and the formation area of the pixel electrode 9a. Further, the planarizing isolation film 19 has a film thickness corresponding to the step 15 (corresponding to the thickness of the pixel electrode 9a) formed on the surface of the dielectric multi-layer film 18. For this reason, the surface of the planarizing isolation film 19 and the surface of the dielectric multi-layer film 18 are formed as a continuous flat surface.

Further, in the embodiment, the first substrate side underlying film 160 formed as a silicon dioxide film is formed on the flat surface formed by the surface of the planarizing isolation film 19 and the surface of the dielectric multi-layer film 18, and the first substrate side alignment film 16 is formed on the upper layer of the first substrate side underlying film 160. Here, since the first substrate side underlying film 160 is formed on the flat surface formed by the surface of the planarizing isolation film 19 and the surface of the dielectric multi-layer film 18, the surface of the first substrate side underlying film 160 is formed as a continuous flat surface. Accordingly, it is possible to appropriately form the first substrate side alignment film 16 by oblique deposition.

Method of Manufacturing Electro-Optical Device 100

Figure 7A:
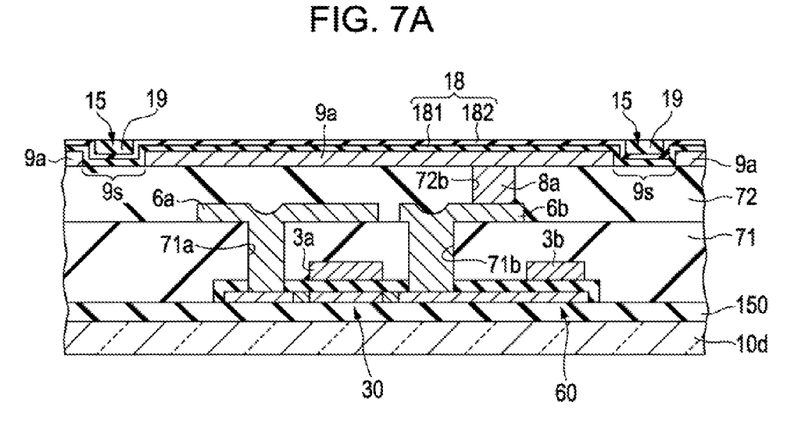
FIGS. 7A and 7B are cross-sectional views illustrating the steps of thinning the planarizing isolation film and forming a first substrate side underlying film in the method of manufacturing the electro-optical device according to the second embodiment of the invention.
Figure 7B:
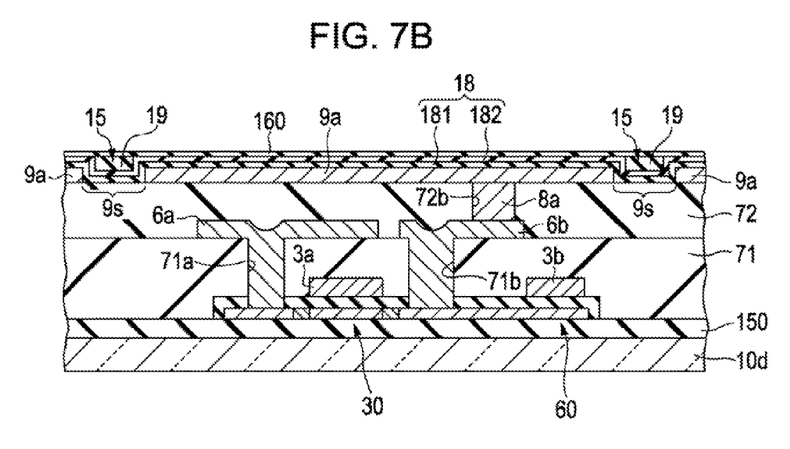

Hereinafter, the configuration of the electro-optical device 100 will be described in detail while describing a method of manufacturing the electro-optical device 100 according to the invention with reference to FIGS. 4A to 7B. FIGS. 7A and 7B are cross-sectional views illustrating the steps of thinning the planarizing isolation film 19 and forming the first substrate side underlying film 160 in the method of manufacturing the electro-optical device 100 according to the second embodiment of the invention.

Figure 4B:
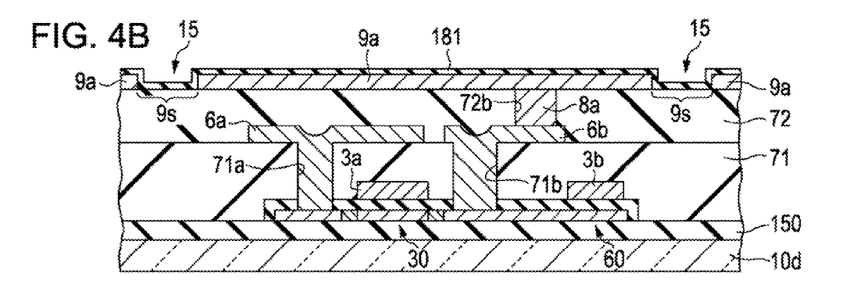
Figure 4C:
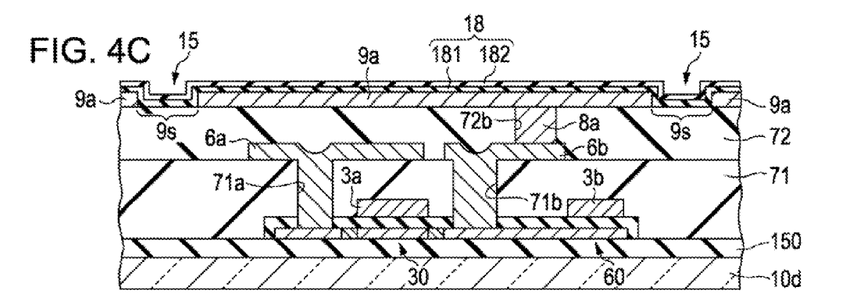
Figure 4D:
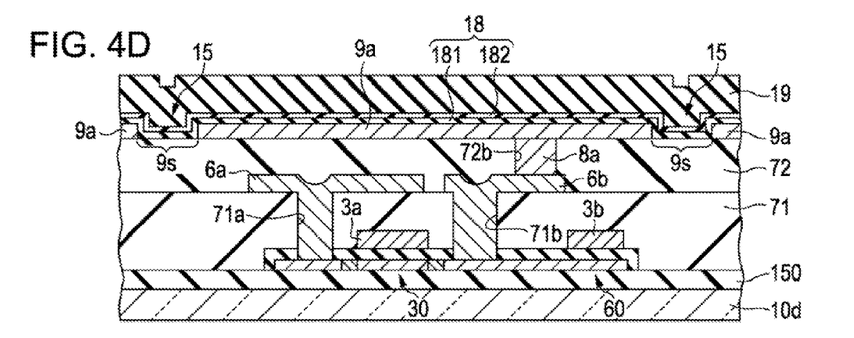
Figure 5:
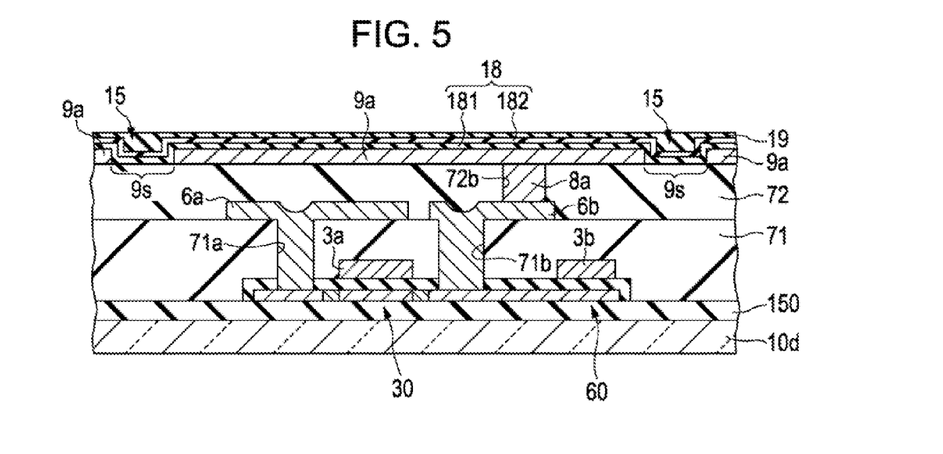
FIG. 5 is a cross-sectional view illustrating the step of thinning the planarizing isolation film in the method of manufacturing the electro-optical device according to the first embodiment of the invention.

Even in the embodiment, as shown in FIG. 4A, the pixel electrode 9a formed as an aluminum-based material such as aluminum or aluminum alloy is formed as an island shape, and then the dielectric multi-layer film 18 is formed by the step of forming the dielectric multi-layer film shown in FIGS. 4B and 4C. Subsequently, in the step of forming the planarizing isolation film shown in FIG. 4D, the planarizing isolation film 19 formed as a thick silicon dioxide film is formed on the upper layer side of the dielectric multi-layer film 18 by a PVD method or a CVD method.

Subsequently, in the embodiment, the surface of the planarizing isolation film 19 is formed as a flat surface by thinning the planarizing isolation film 19 in the planarizing step shown in FIG. 7A. More specifically, the surface of the planarizing isolation film 19 is polished. Even in the polishing, chemical mechanical polishing may be used. According to the chemical mechanical polishing, the planarizing can be performed without polishing the pixel electrode 9a formed as a metallic layer. Therefore, the planarizing isolation film 19 can be left only at the boundary area 9s among the boundary area 9s and the formation area of the pixel electrode 9a. As a result, the surface of the planarizing isolation film 19 and the surface of the dielectric multi-layer film 18 form a continuous flat surface.

Subsequently, in the step of forming the first substrate side underlying film shown in FIG. 7B, the first substrate side underlying film 160 formed as a silicon dioxide film is formed by a PVD method or a CVD method. The surface of the first substrate side underlying film 160 is a continuous flat surface.

Subsequently, as shown in FIG. 6, the first substrate side alignment film 16 is formed on the surface of the first substrate side underlying film 160 by oblique deposition.

Main Effect of Embodiment

As described above, even in the electro-optical device 100 of the embodiment, as in the first embodiment, the pixel electrode 9a formed as a reflection film is formed at each of the plurality of pixels 100a of the first substrate 10, and the dielectric multi-layer film 18 is formed on the upper layer side of the pixel electrode 9a throughout the plurality of pixels 100a. Subsequently, the planarizing isolation film 19 is formed on the upper layer side of the dielectric multi-layer film 18, and then the planarizing isolation film 19 is thinned from the surface side thereof. That is, the dielectric multi-layer film 18 is formed while the planarizing isolation film 19 or the like is not present on the upper layer side of the pixel electrode 9a, and then the step 15 is buried by the planarizing isolation film 19. For this reason, even when the step 15 is buried by the planarizing isolation film 19 to form a flat surface, the dielectric multi-layer film 18 is directly formed on the pixel electrode 9a, and the dielectric layer (the first dielectric layer 181 and the second dielectric layer 182) forming the dielectric multi-layer film 18 is not subjected to polishing or the like. Therefore, the film thickness of the dielectric layer (the first dielectric layer 181 and the second dielectric layer 182) forming the dielectric multi-layer film 18 is controlled with high precision in a film formation condition. Therefore, even when a configuration is adopted in which the step 15 is buried by the planarizing isolation film 19 and the first substrate side alignment film 16 is formed on the flat surface, it is possible to form the dielectric multi-layer film 18 having an appropriate film composition and serving as a reflection increasing film.

Here, the planarizing isolation film 19 is left only at the boundary area 9s, and the planarizing isolation film 19 is not left at the formation area of the pixel electrode 9a. For this reason, although the second dielectric layer 182 (silicon nitride film) forming the uppermost layer of the dielectric multi-layer film 18 is exposed from the planarizing isolation film 19, the first substrate side underlying film 160 formed as a silicon dioxide film is formed on the upper layer of the second dielectric layer 182. For this reason, since the first substrate side alignment film 16 and the second substrate side alignment film 26 can be formed on the underlying film formed as the same isolation film, it is possible to form the first substrate side alignment film 16 and the second substrate side alignment film 26 to have the same characteristic. Therefore, even when the liquid crystal layer 50 is driven by an AC signal of which the polarity is reversed, display errors such as image persistence do not occur, thereby displaying an image with high quality.

Further, the first substrate side underlying film 160 is formed on the upper layer of the dielectric multi-layer film 18 in the formation area of the pixel electrode 9a, but the first substrate side underlying film 160 is a silicon dioxide film that has a refractive index lower than that of the second dielectric layer 182 (silicon nitride film) forming the uppermost layer in the dielectric multi-layer film 18. Further, in the first substrate side underlying film 160, the film thickness is controlled with high precision in a film formation condition. For this reason, even when the first substrate side underlying film 160 is laminated on the upper layer of the dielectric multi-layer film 18 in the formation area of the pixel electrode 9a, the first substrate side underlying film 160 does not greatly degrade the characteristic as the reflection increasing film of the dielectric multi-layer film 18.

Other Embodiments

In the above-described embodiments, the dielectric multi-layer film 18 adopts a double layer structure having the first dielectric layer 181 disposed on the lower layer side and formed as a silicon dioxide film having a thickness of 60 to 80 nm and the second dielectric layer 182 disposed on the upper layer side and formed as a silicon nitride film having a thickness of 50 to 70 nm. However, a dielectric film other than the above-described dielectric film may be used so long as it is configured to alternately laminate a low refractive index layer formed as a dielectric film having low refractive index and a high refractive index layer formed as a dielectric film having refractive index higher than that of the low refractive index layer. In addition to the configuration in which the low refractive index layer and the high refractive index layer are alternately laminated to thereby form double layers in total, a configuration may be adopted in which several pairs (for example, two pairs) each having the low refractive index layer and the high refractive index layer are laminated. Here, the low refractive index layer and the high refractive index layer are defined by a relative difference in the refractive index, and there is no absolute value in the difference. Accordingly, for example, when the layer having a refractive index less than 1.7 is defined as the low refractive index layer, and the layer having a refractive index equal to or more than 1.7 is defined as the high refractive index layer, the low refractive index layer and the high refractive index layer may be formed by using one or a mixture of the following materials.

Low Refractive Index Layer magnesium fluoride ($MgF_2$)/refractive index=1.38
silicon dioxide ($SiO_2$)/refractive index=1.46
lanthanum fluoride ($LaF_3$)/refractive index=1.59
aluminum oxide ($Al_2O_3$)/refractive index=1.62
cerium fluoride ($CeF_3$)/refractive index=1.63

High Refractive Index Layer
indium oxide ($In_2O_3$)/refractive index=2.00
silicon nitride ($Si_3N_4$)/refractive index=2.05
titanium oxide ($TiO_2$)/refractive index=2.10
zirconium oxide ($ZrOF_2$)/refractive index=2.10
tantalum oxide ($Ta_2O_5$)/refractive index=2.10
tungsten oxide ($WO_3$)/refractive index=2.35
zinc sulfide (ZnS)/refractive index=2.35
cerium oxide ($CeO_2$)/refractive index=2.42

Further, in the above-described embodiment, the overall pixel electrode 9a is formed as a reflection layer, but the pixel electrode 9a may adopt a configuration in which a reflection layer and a transmissive conduction layer are laminated.

Example of Mounting to Electronic Apparatus

Figure 8A:
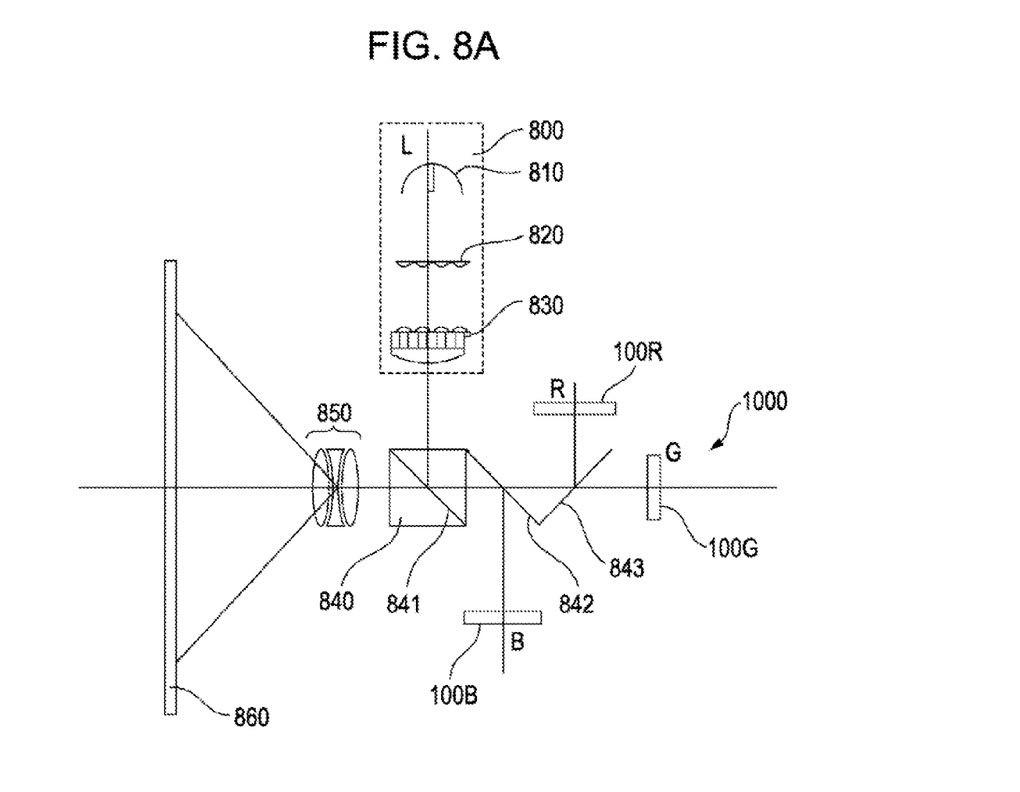
FIGS. 8A to 8C are diagrams illustrating electronic apparatuses using the reflection type electro-optical device according to the invention.
Figure 8B:
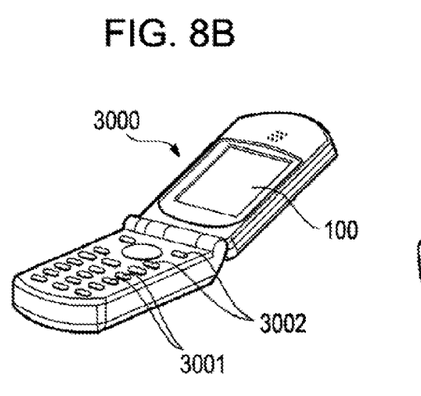
Figure 8C:
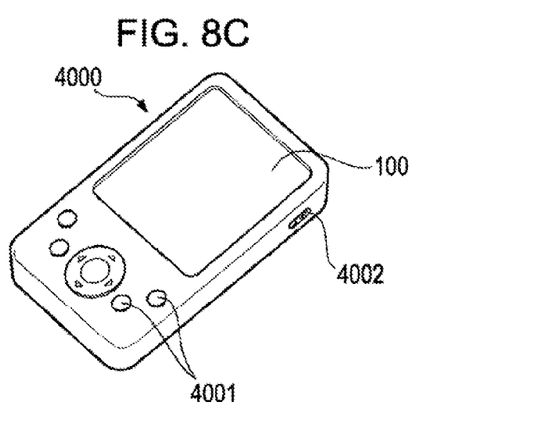

The reflection type electro-optical device 100 according to the invention may be used in an electronic apparatus such as a projection type display device (a liquid crystal projector/an electronic apparatus) shown in FIG. 8A or a portable electronic apparatus shown in FIGS. 8B and 8C.

A projection type display device 1000 shown in FIG. 8A includes a polarizing illumination device 800 in which a light source unit 810, an integrator lens 820, and a polarizing conversion element 830 are arranged along a system optical axis L. Further, the projection type display device 1000 includes a polarizing beam splitter 840 which reflects the S-polarized light flux emitted from the polarizing illumination device 800 by using an S-polarizing light flux reflection surface 841; a diachronic mirror 842 which divides the component of blue light (B) from the light reflected from the S-polarizing light flux reflection surface 841 of the polarizing beam splitter 840; and a diachronic mirror 843 which reflects and divides the component of red light (R) from the light flux of which the blue light is divided, where the polarizing beam splitter 840, the diachronic mirror 842, and the diachronic mirror 843 are arranged along the system optical axis L. Further, the projection type display device 1000 includes three sheets of electro-optical devices 100 (electro-optical devices 100R, 100G, and 100B) to which each color light is incident. In the projection type display device 1000, the light modulated by the three electro-optical devices 100R, 100G, and 100B is synthesized by the dichroic mirrors 842 and 843 and the polarizing beam splitter 840, and the synthesized light is projected onto a screen 860 by using a projection type optical system 850.

Next, a cellular phone 3000 shown in FIG. 8B includes a plurality of manipulation buttons 3001, scroll buttons 3002, and the electro-optical device 100 as a display unit. When the scroll buttons 3002 are manipulated, the image displayed on the electro-optical device 100 is scrolled. A PDA (Personal Digital Assistant) 4000 shown in FIG. 8C includes a plurality of manipulation buttons 4001, a power switch 4002, and the electro-optical device 100 as a display unit. When the power switch 4002 is operated, information such as an address book or a schedule note is displayed on the electro-optical device 100.

Further, when a color filter is formed on the second substrate 20 or the like, the electro-optical device 100 capable of performing a color display thereon can be configured. Furthermore, when the electro-optical device 100 having the color filter formed thereon is used, a single projection type display device can be configured.

Moreover, as an electronic apparatus mounted with the electro-optical device 100 according to the invention, in addition to the examples shown in FIGS. 8A, 8B, and 8C, a head mount display, a digital camera, an LCD TV, a view finder, a recorder, a car navigation device, a pager, an electronic notebook, a calculator, a word processor, a workstation, a display phone, a POS terminal, a bank terminal, and the like may be exemplified.

What is claimed is:

1. An electro-optical device that holds a liquid crystal layer between a first substrate and a second substrate, the electro-optical device comprising:
   a transistor;
   a first interlayer isolation film which covers the transistor;
   a first electrode which is electrically connected to a source or drain region via a first through hole of the first interlayer isolation film;
   a second interlayer isolation film which covers the first electrode;
   a reflection film which is formed at one of a plurality of pixels, the reflection film being disposed on the second interlayer isolation film, the reflection film being electrically connected to the first electrode via a plug disposed in a second through hole of the second interlayer isolation film;
   a dielectric multi-layer film which is formed on the upper layer side of the reflection film;
   a planarizing isolation film which is formed on the upper layer side of the dielectric multi-layer film, and buries a step of a reflection film formation area, the reflection film formation area having the reflection film and a boundary area, the boundary area being an area between adjacent reflection films;
   a first substrate side alignment film which is formed on the upper layer side of the planarizing isolation film,
   a second substrate side underlying film which is formed on the surface facing the first substrate in the second substrate; and
   a second substrate side alignment film which is formed on the surface of the second substrate side underlying film,
   wherein the reflection film, the dielectric multi-layer film, the planarizing isolation film, and the first substrate side alignment film are formed on the first substrate and are facing the second substrate,
   wherein an area of the reflection film includes an area of a semiconductor layer of the transistor in plan view,
   wherein the second substrate side underlying film and the planarizing isolation film are each formed of the same material.

2. The electro-optical device according to claim 1, wherein the reflection film is a pixel electrode.

3. The electro-optical device according to claim 1,
   wherein the film thickness of the planarizing isolation film at the boundary area is thicker than that at the reflection film formation area, and the planarizing isolation film is formed at both the boundary area and the reflection film formation area, and
   wherein the surface of the planarizing isolation film is formed as a continuous flat surface.

4. The electro-optical device according to claim 3, wherein the refractive index of the planarizing isolation film is lower than that of a dielectric layer forming the uppermost layer in the dielectric multi-layer film.

5. The electro-optical device according to claim 1,
   wherein the planarizing isolation film is formed only at the boundary area among the boundary area and the reflection film formation area, and
   wherein the surface of the planarizing isolation film and the surface of the dielectric multi-layer film located on the reflection film are formed as a continuous flat surface.

6. The electro-optical device according to claim 5, further comprising:

a first substrate side underlying film which is formed on the flat surface and has a refractive index lower than that of the dielectric layer forming the uppermost layer of the dielectric multi-layer film, wherein the first substrate side alignment film is formed on the upper layer of the first substrate side underlying film.

7. The electro-optical device according to claim 5, further comprising: wherein the second substrate side underlying film and the first substrate side underlying film are formed of the same material.

8. An electronic apparatus comprising:
the electro-optical device according to claim 1.

9. The electronic apparatus according to claim 8, further comprising:
a light source unit which supplies light to the electro-optical device; and
a projection optical system which projects light optically modulated by the electro-optical device.

10. The electro-optical device according to claim 1, wherein:
the first substrate side alignment film is formed as an oblique deposition film, and
the second substrate side alignment film is formed as an oblique deposition film.

11. An electro-optical device comprising:
a transistor;
a first interlayer isolation film that covers the transistor;
a first electrode that is electrically connected to a source or drain region via a first through hole of the first interlayer isolation film;
a second interlayer isolation film that covers the first electrode;
a reflection film that is disposed on the second interlayer isolation film, the reflection film being electrically connected to the first electrode via a plug disposed in a second through hole of the second interlayer isolation film;
a dielectric multi-layer film that is disposed on the reflection film;
a planarizing isolation film that is disposed on the dielectric multi-layer, the planarizing isolation film burying a step of the reflection film;
a first substrate side alignment film that is disposed on the planarizing isolation film,
a second substrate side underlying film which is formed on the surface facing a first substrate in a second substrate; and
a second substrate side alignment film which is formed on the surface of the second substrate side underlying film,
the reflection film, the dielectric multi-layer film, the planarizing isolation film and the first substrate alignment film being disposed on the first substrate, and facing the second substrate,
an area of the reflection film including an area of a semiconductor layer of the transistor in plan view,
wherein the second substrate side underlying film and the planarizing isolation film are each formed of the same material.

12. The electro-optical device according to claim 1, wherein the area of the reflection film overlaps entire area of the semiconductor layer of the transistor in plan view.

13. The electro-optical device according to claim 11, wherein the area of the reflection film overlaps entire area of the semiconductor layer of the transistor in plan view.

14. The electro-optical device according to claim 11, wherein:
the first substrate side alignment film is formed as an oblique deposition film, and
the second substrate side alignment film is formed as an oblique deposition film.

* * * * *